(12) United States Patent
Alex et al.

(10) Patent No.: US 9,351,156 B2
(45) Date of Patent: May 24, 2016

(54) PHYSICAL LAYER ENCRYPTION FOR MIMO COMMUNICATION NETWORKS

(71) Applicant: Broadcom Corporation, Irvine, CA (US)

(72) Inventors: Sam Alex, Sunnyvale, CA (US); Louay Jalloul, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 295 days.

(21) Appl. No.: 13/954,494

(22) Filed: Jul. 30, 2013

(65) Prior Publication Data

US 2015/0036821 A1 Feb. 5, 2015

(51) Int. Cl.
*H04W 4/00* (2009.01)
*H04W 12/02* (2009.01)
*H04B 7/06* (2006.01)
*H04W 88/08* (2009.01)

(52) U.S. Cl.
CPC ............. *H04W 12/02* (2013.01); *H04B 7/0617* (2013.01); *H04B 7/0619* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2007/0155336 A1* | 7/2007 | Nam et al. | 455/69 |
| 2008/0316099 A1* | 12/2008 | Fujii | 342/373 |
| 2009/0046009 A1* | 2/2009 | Fujii | 342/373 |
| 2010/0080323 A1* | 4/2010 | Mueck et al. | 375/296 |
| 2011/0012787 A1* | 1/2011 | Na et al. | 342/373 |
| 2014/0044202 A1* | 2/2014 | Hui | 375/260 |

* cited by examiner

*Primary Examiner* — Bob Phunkulh
(74) *Attorney, Agent, or Firm* — Sterne, Kessler, Goldstein & Fox P.L.L.C.

(57) ABSTRACT

Systems and methods are provided for encrypting a data transmission from a base station at the physical layer, such that the data transmission can only be decoded successfully by an intended UE. In an embodiment, a desired signal component, including a data signal for an intended UE, is combined with an interference component to generate a signal for transmission. The interference component is designed such that it falls in a null space of the channel from the base station to the intended UE and is therefore not received by the intended UE. In contrast, for an unintended UE, the interference component is designed to interfere with the desired signal component at the unintended UE, preventing the unintended UE from successfully decoding the data transmission.

20 Claims, 5 Drawing Sheets

PHYSICAL LAYER ENCRYPTION FOR MIMO COMMUNICATION NETWORKS

FIELD OF THE INVENTION

The present disclosure relates generally to physical layer encryption for Multi-Input-Multi-Output (MIMO) multi-access communication networks.

BACKGROUND

Background Art

In a multi-access communication environment (e.g., cellular network), a user equipment (UE) may be able to receive a data transmission that is intended by the access point (e.g., base station) for another nearby UE. Further, with knowledge of the modulation scheme and other parameters of the other UE, the UE may be capable of successfully decoding the data transmission.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
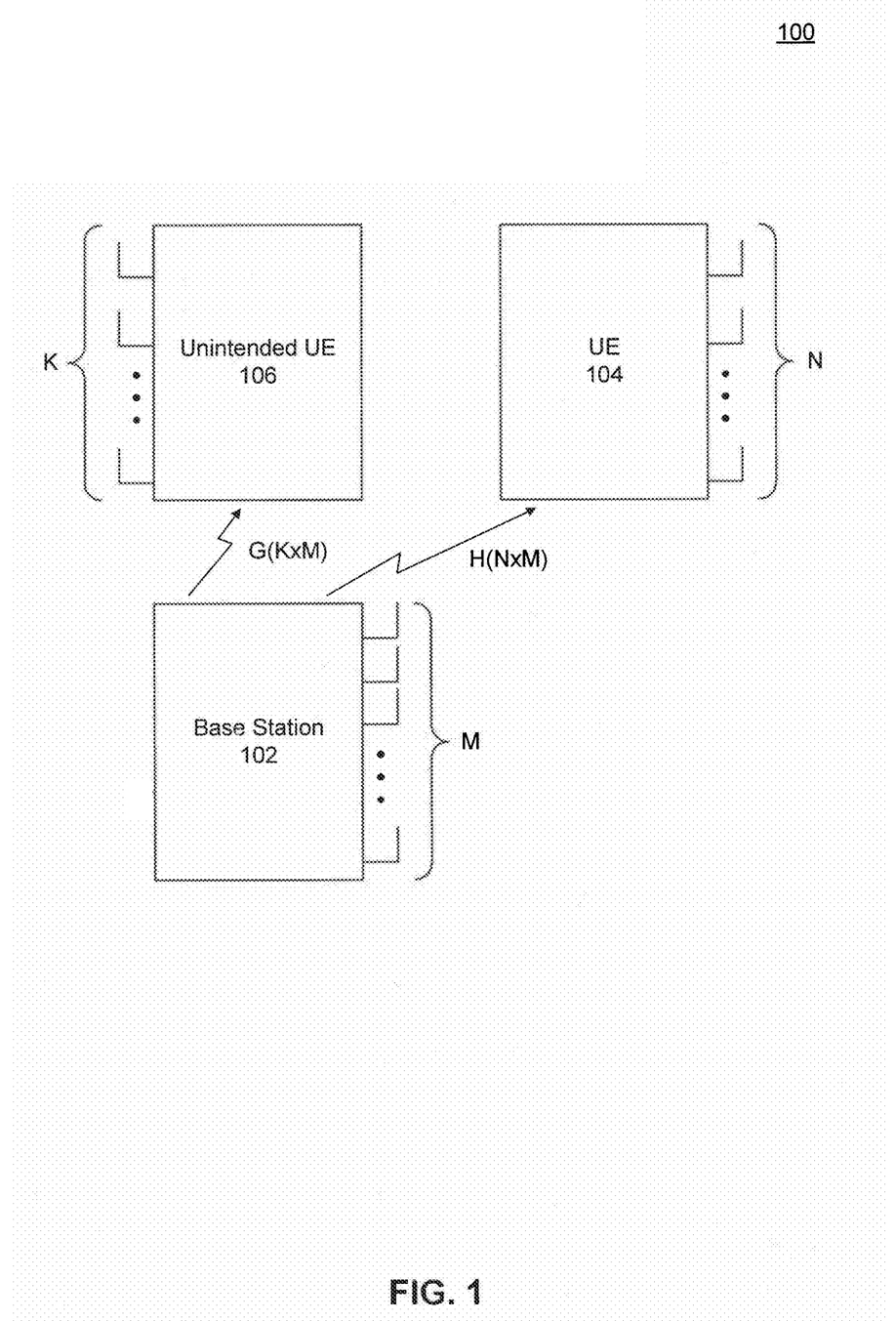
FIG. 1 illustrates an example environment in which embodiments can be practiced or implemented.

FIG. 1 illustrates an example environment 100 in which embodiments can be practiced or implemented. Example environment 100 is provided for the purpose of illustration only and is not limiting of embodiments. As shown in FIG. 1, example environment 100 includes a base station 102, a user equipment (UE) 104, and a UE 106.

Base station 102 includes M transmit antennas, which provide base station 102 with a transmit space of M spatial dimensions. For example, base station 102 can be a massive Multi-Input-Multi-Output (MIMO) (M-MIMO) base station with a large number of transmit antennas (e.g., 100 transmit antennas). In example environment 100, base station 102 serves UE 104 and may or may not serve UE 106. For the purpose of illustration only, it is assumed that UE 104 has N receive antennas (e.g., N=2), resulting in a N×M downlink channel H from base station 102 to UE 104. UE 106 is assumed to have K receive antennas (which may or may not be equal to N), resulting in a K×M downlink channel G from base station 102 to UE 106.

In an embodiment, base station 102 transmits a data signal intended for UE 104. For the purpose of illustration of embodiments, it is assumed that UE 106 is able to receive the data signal, even though UE 106 is an unintended UE with respect to the data transmission. For example, UE 106 can be a UE that unintentionally receives the data transmission or an eavesdropper/sniffer UE trying to intentionally receive and decode the data transmission. With knowledge of certain parameters of the data transmission (e.g., modulation scheme) from base station 102 to UE 104, UE 106 may be able to successfully decode the data transmission to retrieve the data signal intended for UE 104.

Embodiments, as further described below, provide systems and methods for encrypting a data transmission from a base station, at the physical layer, such that the data transmission can only be decoded successfully by its intended UE. In an embodiment, a desired signal component, including a data signal for an intended UE, is combined with an interference component to generate a signal for transmission. The interference component is designed such that it falls in a null space of the channel from the base station to the intended UE and is therefore not received by the intended UE. In contrast, the unintended UE receives a mixture of the signal component and the interference component of the transmitted signal, which prevents the unintended UE from successfully decoding the data transmission. Embodiments are well suited for M-MIMO multi-access communication networks (e.g., cellular networks, Wireless Local Area Network (WLANs), etc.), but can also be used for traditional MIMO communication networks.

Figure 2:
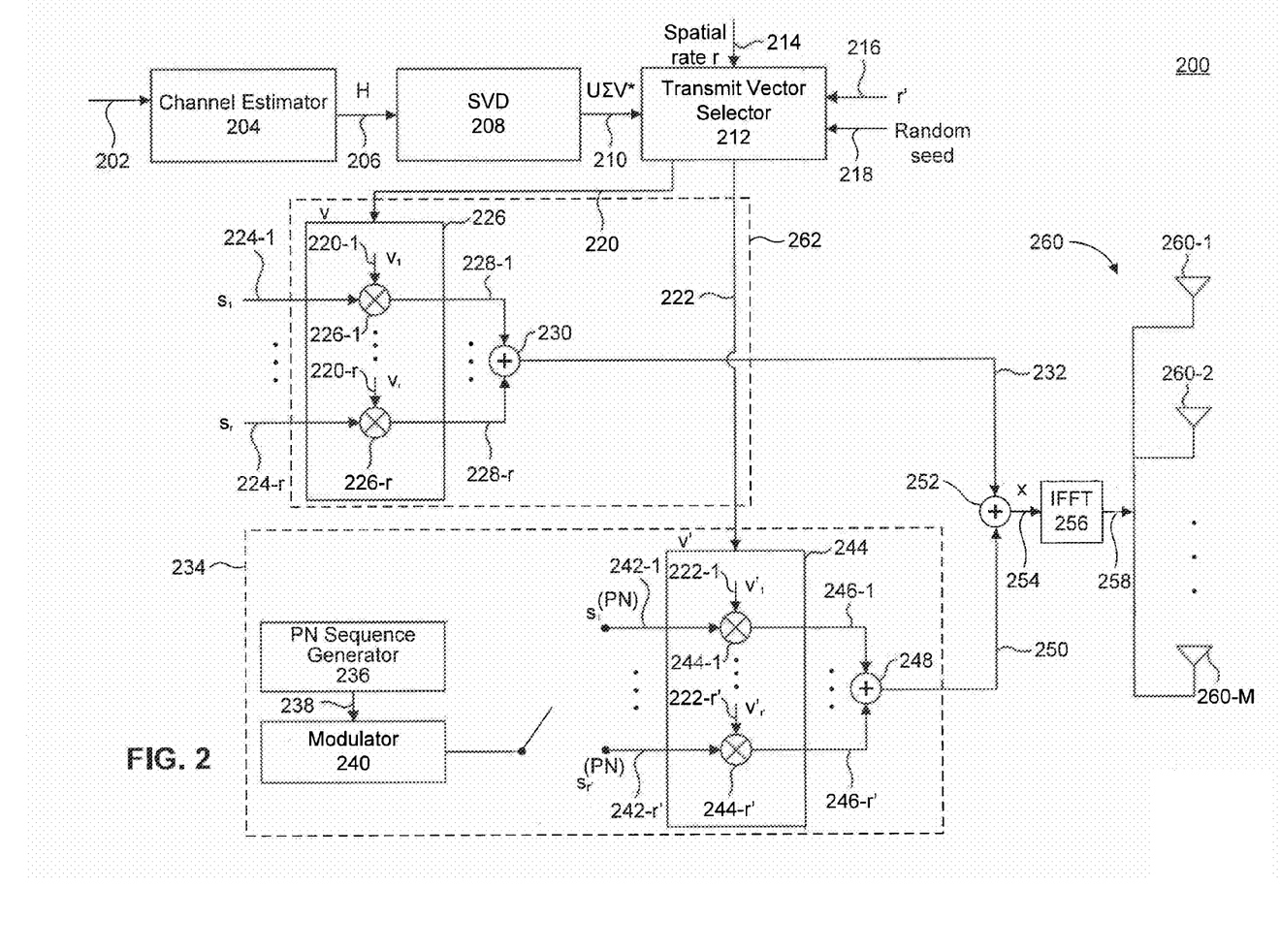
FIG. 2 illustrates an example system according to an embodiment.

FIG. 2 illustrates an example system 200 according to an embodiment. Example system 200 is provided for the purpose of illustration only and is not limiting of embodiments. Example system 200 can be implemented in a base station (e.g., base station 102) to encrypt a data transmission to an intended UE (e.g., UE 104). The base station can be a M-MIMO or a traditional base station. As shown in FIG. 2, example system 200 includes a channel estimator 204, a singular value decomposition (SVD) module 208, a transmit vector selector module 212, a beamforming module 262, an interference generator module 234, an Inverse Fast Fourier Transform (IFFT) module 256, and an antenna module 260.

Channel estimator 204 is configured to receive an input signal 202 and to determine a downlink channel H to the intended UE. In an embodiment, input signal 202 includes feedback from the intended UE, including sounding reference signals, channel state information (CSI), etc. Where the base station includes M transmit antennas and the intended UE includes N receive antennas, downlink channel H is represented by an N×M matrix. In an embodiment, channel estimator 204 outputs an N×M matrix H 206, which is the transpose of H.

SVD module 208 is configured to generate a singular value decomposition 210 of H 206. Singular value decomposition 210 represents H 206 as the product of an N×N unitary matrix U, an N×M diagonal matrix Σ, and an M×M unitary matrix V*. Since V is unitary, the column vectors are orthogonal to each other. The same applies for column vectors of U.

Transmit vector selector module 212 is configured to determine, using singular value decomposition 210, a plurality of transmit vectors v 220 and a plurality of orthogonal-to-transmit vectors v' 222. Transmit vectors v 220 are used to precode data symbols to generate a desired signal component. In an embodiment, transmit vectors v 220 are selected so that the resulting desired signal component is beamformed to the UE. For example, transmit vectors v 220 can be selected to Eigen-mode beamform the resulting desired signal component, exciting one or more (best) Eigen-modes of the downlink channel H to the UE. Orthogonal-to-transmit vectors v' 222 are selected to result in an interference component that corrupts (or hides) the desired signal component for an unintended UE (preventing it from decoding the desired signal component) but that does not affect the reception of the desired signal component by the intended UE.

In an embodiment, transmit vector selector module 212 receives an input 214 indicating a spatial rate r to the intended UE, and an input 216 indicating a number r' of spatial dimensions of the transmit space of the base station to be used for generating the interference component. The spatial rate r depends on the number of receive antennas at the intended UE (r≤N) and on the eigenvalue spread of the downlink channel H, and determines the number of transmit vectors v 220. In an embodiment, the spatial rate r is selected such that it is significantly smaller than the number of spatial dimensions M of the transmit space of the base station. The number r' is governed by the number of spatial dimensions M of the transmit space of the base station and the spatial rate r (r'≤M−r), and determines the number of orthogonal-to-transmit vectors v' 222. Generally, a larger r' produces a greater interference component, which corrupts even further the desired signal component at an unintended UE, but requires more transmit power.

In an embodiment, transmit vectors v 220 are chosen from the unitary matrix V. For example, transmit vectors v 220 may be the first and second column vectors $v_1$ and $v_2$ of the unitary matrix V when a spatial rate r=2 is employed. Orthogonal-to-transmit vectors v' 222 may be chosen from the remaining M-2 column vectors of the unitary matrix V. Because V is a unitary matrix, its column vectors are orthogonal to each other, and transmit vectors v 220 are orthogonal to orthogonal-to-transmit vectors v' 222.

In an embodiment, transmit vector selector module 212 receives an input 218 including a random seed and uses the random seed to select orthogonal-to-transmit vectors v' 222 at random from the remaining M-2 column vectors of V. In another embodiment, if the base station knows the identity of the unintended UE, then channel estimator 204 can be configured to determine the downlink channel to the unintended UE, and transmit vector selector module 212 can be further configured to determine orthogonal-to-transmit vectors v' 222 to increase coupling of the interference component to the downlink channel of the unintended UE, thereby increasing further the corrupting effect of the interference component at the unintended UE. In a further embodiment, the random seed is used to switch the orthogonal-to-transmit vectors v' 222 for each tone (pilot tone and data tone) of a multi-carrier modulated data signal being transmitted. In an embodiment, transmit vectors v 220 are maintained constant, to allow the intended UE to better estimate the downlink channel and perform a robust detection. In another embodiment, the transmit vectors v 220 are maintained constant over only a block of tones, and all tones, data and pilots within the block of tones use the same transmit vectors v 220.

Beamforming module 262 is configured to receive a plurality of data symbols 224-1, . . . , 224-r ($s_1$, . . . , $s_r$) and to generate a desired signal component 232. In an embodiment, desired signal component 232 is designed to be outside a null space of the downlink channel from the base station to the intended UE. Specifically, in an embodiment, beamforming module 262 includes a multiplier module 226 configured to receive data symbols 224-1, . . . , 224-r and transmit vectors v 220 from transmit vector selector module 212, and to multiply data symbols 224-1, . . . , 224-r with transmit vectors v 220 to generate a plurality of beamformed data symbols 228-1, . . . , 228-r. In an embodiment, multiplier module 226 includes a plurality of multipliers 226-1, . . . , 226-r, each configured to multiply a respective data symbol 224-k ($s_k$) with a respective transmit vector 220-k ($v_k$) to generate a beamformed data symbol 228-k (1≤k≤r). Data symbols 228-1, . . . , 228-r are combined by a combiner 230 to generate desired signal component 232.

Interference generator module 234 includes a pseudorandom noise (PN) sequence generator 236, a modulator 240, a multiplier module 244, and a combiner 248. PN sequence generator 236 is configured to generate and provide a PN sequence 238 to modulator 240. In an embodiment, PN sequence 238 is unknown to any UE. Modulator 240 is configured to modulate PN sequence 238 to generate a plurality of PN symbols 242-1, . . . , 242-r' ($s_1^{(PN)}$, . . . , $s_{r'}^{(PN)}$). Multiplier module 244 is configured to receive PN symbols 242-1, . . . , 242-r' from modulator 240 and orthogonal-to-transmit vectors v' 222 from transmit vector selector module 212, and to multiply PN symbols 242-1, . . . , 242-r' with orthogonal-to-transmit vectors v' 222 to generate a plurality of interference symbols 246-1, . . . , 246-r'. In an embodiment, multiplier module 244 includes a plurality of multipliers 244-1, . . . , 244-r', each configured to multiply a respective PN symbol 242-k ($s_k^{(PN)}$) with a respective orthogonal-to-transmit vector 222-k ($v'_k$) to generate an interference symbol 246-k (1≤k≤r'). Combiner 248 is configured to combine interference symbols 246-1, . . . , 246-e to generate an interference component 250.

Combiner 252 is configured to combine desired signal component 232 and interference component 250 to generate a signal x 254. Mathematically, signal 254 can be written as:

$$x = \sum_{p=1}^{r} v_p s_p + \sum_{q=1}^{r'} v'_q s_q^{(PN)}$$

where $v_p$ and $v'_q$, represent the transmit vectors and the orthogonal-to-transmit vectors, respectively, r and r' denote the spatial rate to the intended UE and the number of spatial dimensions of the transmit space of the base station employed to create the interference component, respectively, and $s_p$ and $s_q^{(PN)}$ represent the data symbols and the PN symbols.

Signal 254 is buffered and then acted upon by IFFT module 256 to generate an Orthogonal Frequency Division Multiplexing (OFDM) symbol 258. OFDM symbol 258 is then forwarded to antenna module 260. Antenna module 260 includes a plurality of transmit antennas 260-1, . . . , 260-M, and uses a number of them to transmit OFDM symbol 258 to the intended UE. In an embodiment, the number of transmit antennas used to transmit OFDM symbol 258 is equal to the sum of r (spatial rate to the intended UE) and r' (the number of dimensions employed to create the interference component).

In an embodiment, interference component 250 is designed to be in the null space of the downlink channel from the base station to the intended UE. As such, the intended UE does not receive interference component 250 when OFDM symbol 258 is transmitted by the base station and only receives desired signal component 232. In an embodiment, the signal received at the intended UE can be written mathematically as:

$$y = Hx + n = H\sum_{p=1}^{r} v_p s_p + n$$

where H is the downlink channel to the intended UE and n represents noise.

In contrast, interference component 250 will not be in the null space of any other UE's downlink channel (especially in a rich scattering environment, which makes the channels among UEs independent) because no other UE can have an identical downlink channel as the intended UE (a UE that is more than half a wavelength away from the intended UE will have a downlink channel that is significantly different from the downlink channel of the intended UE). Interference component 250 will thus interfere with desired signal component 232 at any UE other than the intended UE. In an embodiment, the signal received at an unintended UE can be written mathematically as:

$$y' = Gx + n = G\sum_{p=1}^{r} v_p s_p + G\sum_{q=1}^{r'} v'_q s_q^{(PN)} + n$$

where G is the downlink channel to the unintended UE and n represents noise.

Figure 3:
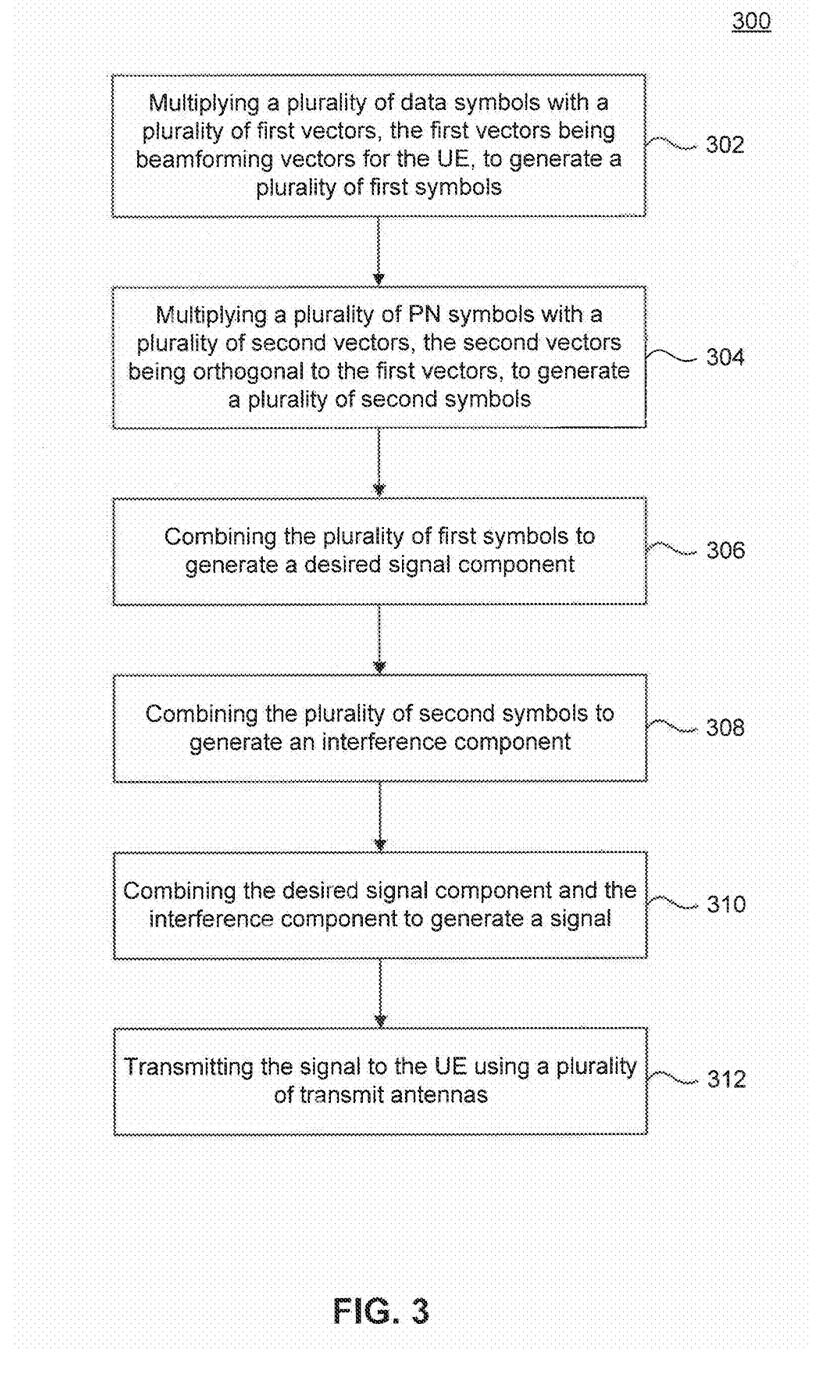
FIG. 3 is an example process for encrypting a data transmission to a user equipment (UE) according to an embodiment.

FIG. 3 is an example process 300 for encrypting a data transmission to a UE according to an embodiment. Example process 300 is provided for the purpose of illustration only and is not limiting of embodiments. Example process 300 can be performed by a base station, using a system such as example system 200, to encrypt a data transmission to an intended UE. Process 300 includes steps 302, 304, 306, 308, 310, and 312. As would be understood by a person of skill in the art, the steps of process 300 can be performed in a different order in other embodiments. For example, step 302 can be performed simultaneously with or after step 304, or steps 302 and 306 can be performed before, simultaneously with, or after steps 304 and 308.

As shown in FIG. 3, example process 300 begins in step 302, which includes multiplying a plurality of data symbols with a plurality of first vectors, the first vectors being beamforming vectors for the UE, to generate a plurality of first symbols. In an embodiment, the first vectors are Eigen-mode beamforming vectors for the UE, determined based on a downlink channel from the base station to the UE.

Then, in step 304, process 300 includes multiplying a plurality of PN symbols with a plurality of second vectors, the second vectors being orthogonal to the first vectors, to generate a plurality of second symbols. In an embodiment, the number of first vectors is significantly smaller than a number of dimensions of a transmit space of the base station, thereby leaving a large number of unoccupied dimensions of the transmit space of the base station from which the second vectors can be selected. The number of second vectors can be selected to be equal to, smaller, or larger than the number of first vectors.

Subsequently, process 300 proceeds to step 306, which includes combining the plurality of first symbols to generate a desired signal component, and then to step 308, which includes combining the plurality of second symbols to generate an interference component. Then, step 310 includes combining the desired signal component and the interference component to generate a signal. Process 300 terminates in step 312, which includes transmitting the signal to the UE using a plurality of transmit antennas. As would be understood by a person of skill in the art, in other embodiments, additional processing can be performed between steps 310 and 312 (e.g., IFFT, frequency up-conversion, power amplification, etc.).

As described above, because the first vectors are beamforming vectors for the UE and the second vectors are orthogonal to the first vectors, the intended UE will only receive the desired signal component of the transmitted signal. In contrast, an unintended UE will receive both the desired signal component and the interference component. In a rich scattering environment where downlink channels to UEs vary significantly despite proximity of UEs, the interference component will be significant at an unintended UE such that the unintended UE is unable to successfully decode the desired signal component.

Figure 4:
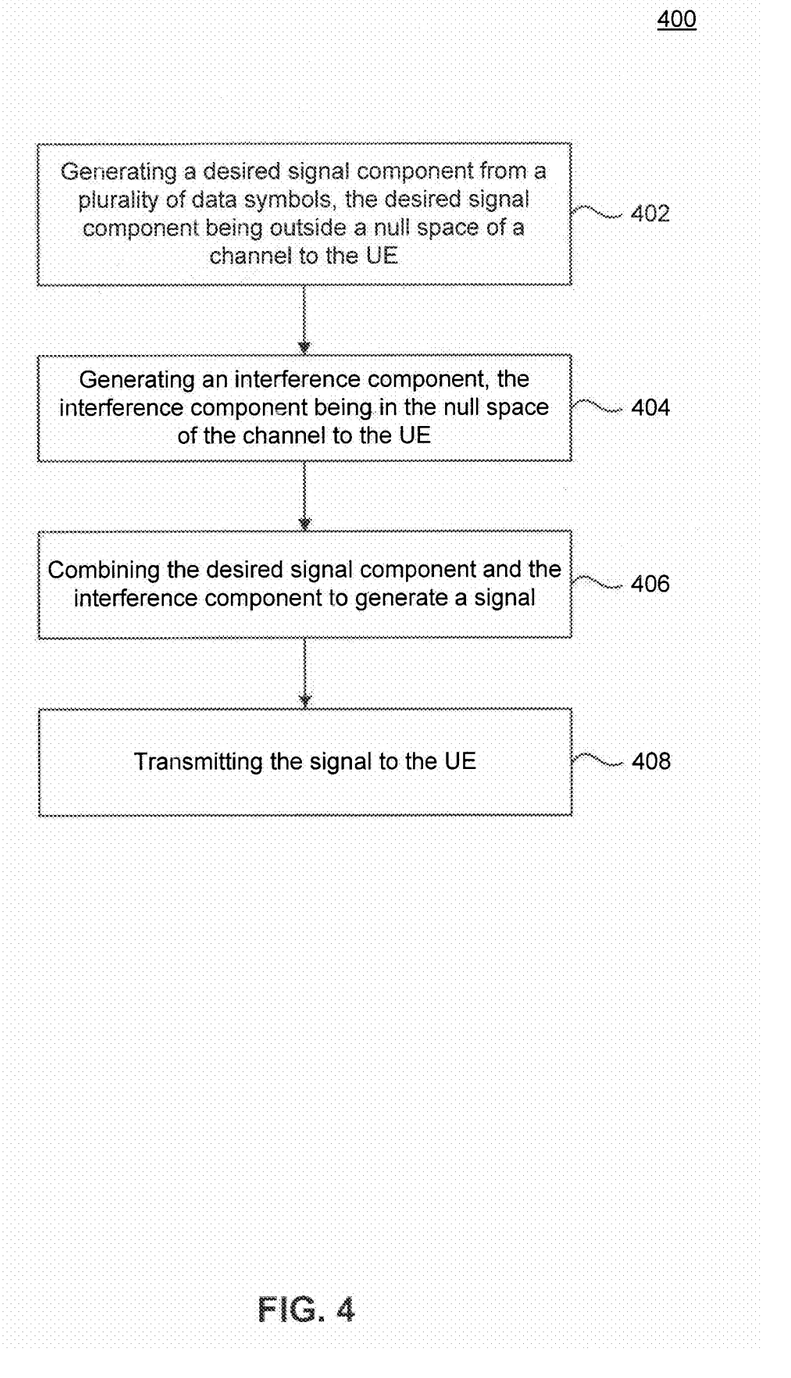
FIG. 4 is another example process for encrypting a data transmission to a user equipment (UE) according to an embodiment.

FIG. 4 is another example process for encrypting a data transmission to a UE according to an embodiment. Example process 400 is provided for the purpose of illustration only and is not limiting of embodiments. Example process 400 can be performed by a base station (e.g., a M-MIMO base station), using a system such as example system 200, to encrypt a data transmission to an intended UE. Process 400 includes steps 402, 404, 406, and 408. As would be understood by a person of skill in the art, the steps of process 400 can be performed in a different order in other embodiments. For example, step 402 can be performed simultaneously with or after step 404.

As shown in FIG. 4, process 400 begins in step 402, which includes generating a desired signal component from a plurality of data symbols, the desired signal component being outside a null space of a channel to the UE. In an embodiment, step 402 is performed at least in part by a beamforming module, such as beamforming module 262 described above with respect to FIG. 2. In an embodiment, process 400 includes, before step 402, determining the channel to the UE using feedback from the UE; and generating a singular value decomposition of the channel. In an embodiment, step 402 further includes determining, using the singular value decomposition of the channel, a plurality of transmit vectors; multiplying the plurality of data symbols with the plurality of transmit vectors to generate a plurality of beamformed data symbols; and combining the plurality of beamformed data symbols to generate the desired signal component. In an embodiment, the plurality of transmit vectors are beamforming vectors for the UE.

Process 400 then proceeds to step 404, which includes generating an interference component, the interference component being in the null space of the channel to the UE. In an embodiment, step 404 is performed at least in part by an interference generator module, such as interference generator module 234 described above with respect to FIG. 2. In an embodiment, step 404 further includes determining, using the singular value decomposition of the channel, a plurality of orthogonal-to-transmit vectors; modulating a pseudorandom noise sequence to generate a plurality of pseudorandom noise symbols; multiplying the plurality of pseudorandom symbols with the plurality of orthogonal-to-transmit vectors to generate a plurality of interference symbols; and combining the plurality of interference symbols to generate the interference component. In an embodiment, the orthogonal-to-transmit vectors are orthogonal to the transmit vectors determined in step 402. In another embodiment, the orthogonal-to-transmit vectors are selected to increase coupling of the interference component to a channel of an unintended UE.

Subsequently, step 406 includes combining the desired signal component and the interference component to generate a signal. Process 400 terminates in step 408, which includes transmitting the signal to the UE. In an embodiment, step 408 further includes transmitting the signal using a plurality of transmit antennas of the base station. In an embodiment, the number of transmit antennas is equal to a sum of the spatial rate r used for the desired signal component and the number r' of spatial dimensions of the transmit space of the base station used to create the interference component.

Figure 5:
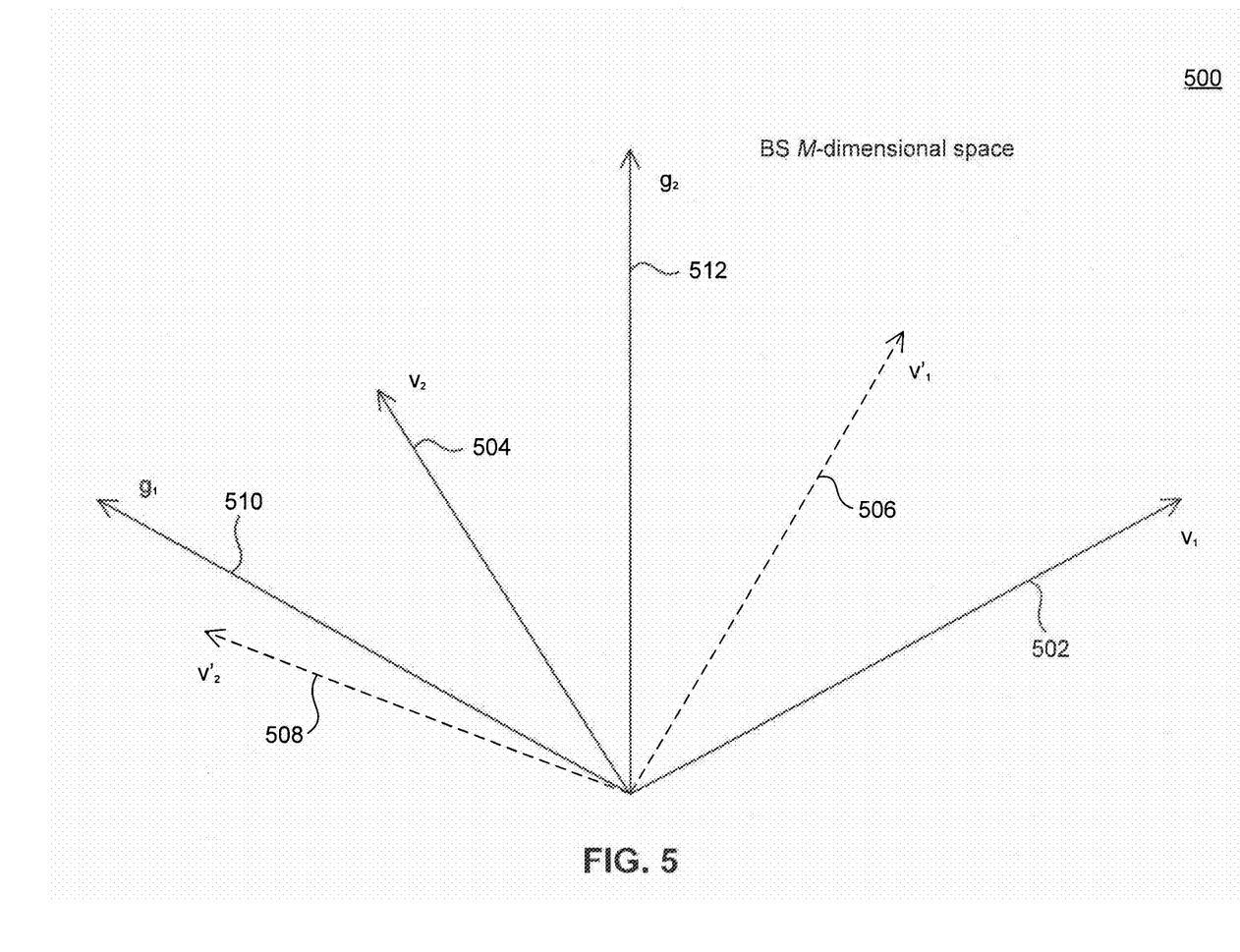
FIG. 5 is an example that illustrates an embodiment.

FIG. 5 is an example 500 that illustrates an embodiment. Example 500 is provided for the purpose of illustration only and is not limiting of embodiments. Specifically, example 500 illustrates using a vector representation of an M-dimensional transmit space of a base station. Vectors $v_1$ 502 and $v_2$ 504 represent the transmit vectors (e.g., beamforming vectors) for an intended UE. Vectors $v'_1$ 506 and $v'_2$ 508 represent orthogonal-to-transmit vectors used to create an interference component as described above. Vectors $v'_1$ 506 and $v'_2$ 508 are in orthogonal dimensions relative to each of vectors $v_1$ 502 and $v_2$ 504. Vectors $g_1$ 510 and $g_2$ 512 represent transmit vectors that would be used by the base station, if it intended to communicate to the unintended UE. It is noted that vectors $g_1$ 510 and $g_2$ 512 are highly unlikely to be a linear transformation of all of and only of transmit vectors $v_1$ 502 and $v_2$ 504 of the intended UE. For this reason, the unintended UE is highly likely to receive the interference component, which is designed to fall in the null space of the downlink channel to the intended UE. Reception of the desired signal component is therefore corrupted at the unintended UE by the interference component.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method performed by a base station for encrypting a data transmission to an intended user equipment (UE), comprising:
   generating a desired signal component from a plurality of data symbols, the desired signal component being outside a null space of a channel to the intended UE;
   generating an interference component unknown to an unintended UE, the interference component being in the null space of the channel to the intended UE;
   encrypting the desired signal component, to prevent the unintended UE from decoding the desired signal component, by combining the desired signal component and the interference component to generate a signal; and
   broadcasting the signal.

2. The method of claim 1, further comprising:
   determining the channel to the intended UE using feedback from the intended UE to the base station; and
   generating a singular value decomposition of the channel.

3. The method of claim 2, wherein generating the desired signal component comprises:
   determining, using the singular value decomposition of the channel, a plurality of transmit vectors;
   multiplying the plurality of data symbols with the plurality of transmit vectors to generate a plurality of beamformed data symbols; and
   combining the plurality of beamformed data symbols to generate the desired signal component.

4. The method of claim 3, wherein a number of the transmit vectors is less than a number of spatial dimensions of a transmit space of the base station.

5. The method of claim 3, wherein generating the interference component comprises:
   determining, using the singular value decomposition of the channel, a plurality of vectors that are orthogonal to the transmit vectors (orthogonal-to-transmit vectors);
   modulating a pseudorandom noise (PN) sequence to generate a plurality of PN symbols;
   multiplying the plurality of PN symbols with the plurality of orthogonal-to-transmit vectors to generate a plurality of interference symbols; and
   combining the plurality of interference symbols to generate the interference component.

6. The method of claim 5, further comprising:
   determining a channel to the unintended UE; and
   determining the plurality of orthogonal-to-transmit vectors to increase coupling of the interference component to the channel of the unintended UE.

7. The method of claim 1, wherein broadcasting the signal comprises transmitting the signal using a plurality of transmit antennas of the base station.

8. The method of claim 1, wherein the intended UE receives only the desired signal component of the signal, and wherein the unintended UE receives both the desired signal component and the interference component.

9. A base station, comprising:
   a beamformer configured to receive a plurality of data symbols and to generate a desired signal component, the desired signal component being outside a null space of a channel from the base station to an intended user equipment (UE);
   an interference generator configured to generate an interference component unknown to an unintended UE, the interference component being in the null space of the channel from the base station to the intended UE; and
   a combiner configured to encrypt the desired signal component, to prevent the unintended UE from decoding the desired signal component, by combining the desired signal component and the interference component to generate a signal for transmission.

10. The base station of claim 9, further comprising:
a channel estimator configured to determine the channel to the intended UE using feedback from the intended UE.

11. The base station of claim 10, further comprising:
a transmit vector selector configured to determine, using a singular value decomposition of the channel, a plurality of transmit vectors and a plurality of orthogonal-to-transmit vectors.

12. The base station of claim 11, wherein a number of the transmit vectors is less than a number of spatial dimensions of a transmit space of the base station.

13. The base station of claim 12, wherein the base station is a massive MIMO base station.

14. The base station of claim 11, wherein the beamformer comprises:
a multiplier configured to multiply the plurality of data symbols with the plurality of transmit vectors to generate a plurality of beamformed data symbols; and
a combiner configured to combine the plurality of beamformed data symbols to generate the desired signal component.

15. The base station of claim 11, wherein the interference generator comprises:
a pseudorandom noise (PN) sequence generator configured to generate a PN sequence;
a modulator configured to modulate the PN sequence to generate a plurality of PN symbols;
a multiplier configured to multiply the plurality of PN symbols with the plurality of orthogonal-to-transmit vectors to generate a plurality of interference symbols; and
a combiner configured to combine the plurality of interference symbols to generate the interference component.

16. The base station of claim 15, wherein the channel estimator is further configured to determine a channel to the unintended UE, and wherein the transmit vector selector is further configured to determine the plurality of orthogonal-to-transmit vectors to increase coupling of the interference component to the channel of the unintended UE.

17. A method performed by a base station for encrypting a data transmission to an intended user equipment (UE), comprising:
multiplying, a plurality of data symbols with a plurality of first vectors to generate a plurality of first symbols;
multiplying a plurality of pseudorandom noise (PN) symbols with a plurality of second vectors to generate a plurality of second symbols;
combining the plurality of first symbols to generate a desired signal component;
combining the plurality of second symbols to generate an interference component;
encrypting the desired signal component, to prevent an unintended UE from decoding the desired signal component, by combining the desired signal component and the interference component to generate a signal; and
broadcasting the signal using a plurality of transmit antennas.

18. The method of claim 17, wherein the plurality of first vectors are beamforming vectors for the intended UE, and wherein the plurality of second vectors are orthogonal to the plurality of first vectors.

19. The method of claim 18, wherein a number of the plurality of first vectors is less than a number of spatial dimensions of a transmit space of the base station.

20. The method of claim 19, wherein the plurality of second vectors are selected from spatial dimensions of the transmit space of the base station that are unoccupied by the plurality of first vectors.

\* \* \* \* \*